UNITED STATES PATENT OFFICE.

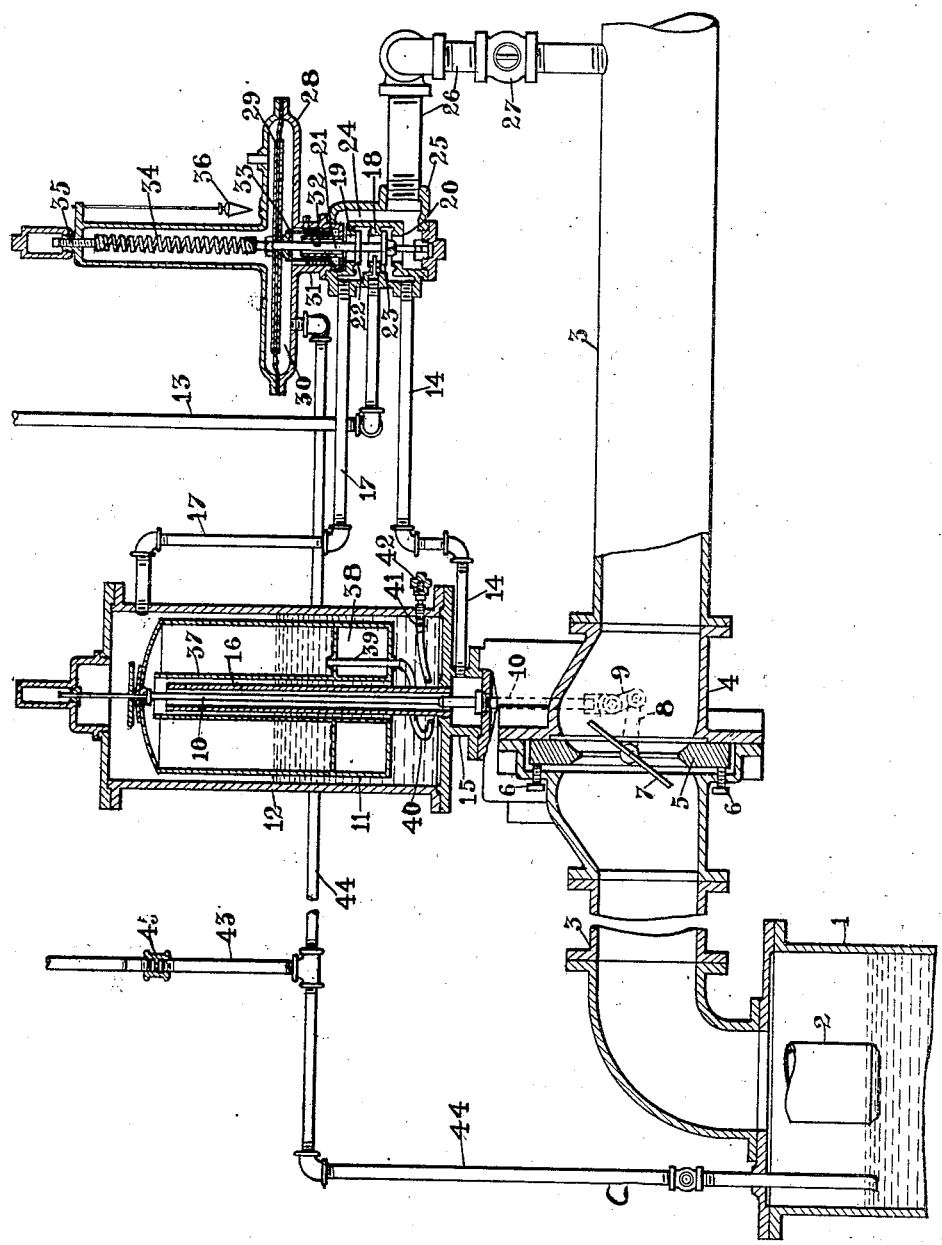

FRANK L. CROSS, OF DETROIT, MICHIGAN.

MEANS FOR CONTROLLING FLOW THROUGH A CONDUIT.

1,054,179.

Specification of Letters Patent. Patented Feb. 25, 1913.

Application filed March 5, 1910. Serial No. 547,461.

*To all whom it may concern:*

Be it known that I, FRANK L. CROSS, a citizen of the United States of America, residing at Detroit, in the county of Wayne and State of Michigan, have invented certain new and useful Improvements in Means for Controlling Flow Through Conduits, of which the following is a specification, reference being had therein to the accompanying drawings.

This invention relates to means for maintaining constant pressure in a hydraulic main or like part of a gas generating or fluid distributing system through which foul or unpurified gas is passing, and more particularly to an arrangement of the controlling apparatus whereby the latter is not rendered inoperative or clogged by contact with impurities in the main.

In general terms the invention includes a valve that regulates the flow through the main, a pressure governor for the valve that is operated by purified gas or fluid from a source of supply exterior to the main, and a master valve that controls the supply of operating gas or fluid for the governor, and is controlled by static pressure of the foul gas in the main that is transmitted to the operating mechanism of the master valve either directly or by a column of purified gas or fluid interposed between the foul gas or fluid and the mechanism from a source of supply exterior to the main. The apparatus is also so arranged if preferred, that the purified gas or fluid passes into the conduit or main and therefore does not taint the atmosphere in the vicinity of the apparatus.

The invention consists in the matters hereinafter set forth, and more particularly pointed out in the appended claims.

The drawing is a view partly in elevation and partly in section, of one form of apparatus embodying features of the invention.

Referring thereto, a hydraulic main 1, or like conduit, to which crude gas is admitted through one or more dip pipes 2 entering a water or liquor seal, has an outlet 3 in which a regulating valve is inserted. In preferred form, this is a casing 4 with a bodily removable valve-seat plate 5 held by screws 6 or the like, in which a closure 7 of the butterfly type is mounted. The latter is operated through suitable connections, as a rock arm 8, link 9 and stem 10 by a float or bell 11 vertically movable in a closed casing or float tank 12, the bell and tank constituting one form of pressure governor.

Purified gas or fluid under head or pressure from an independent source of supply is conducted by a pipe 13 into the inlet of a master valve. The latter is arranged to direct this gas or fluid either into the bell 11 through a pipe 14 entering the base 15 of the float tank and a stand pipe 16 through which, as a matter of convenient construction, the stem 10 passes, or into the float tank above the bell through a pipe 17. As herein indicated, the inlet of the casing terminates in a port in the periphery of an apertured valve-seat 18 which lies between a pair of exhaust valve-seats 19 and 20. The outlets from which the pipes 14 and 17 lead, are between the inlet seat and the exhaust seats respectively. A stem 21 with parallel plates 22 and 23 thereon, forms a closure for the valve-casing, that at the upper end of its throw, as shown in the figure, puts the inlet pipe 13 and tank pipe 17 in communication, and the bell pipe and lower exhaust opening together, and at the lower end of its throw reverses those connections. Both exhaust openings in the exhaust seats are in constant communication, as through a by-pass 24 with an exhaust nipple 25, discharging into the outlet branch 3 through suitably arranged fittings indicated at 26. A cut-off valve 27 may be inserted in the latter, if desired.

A drum 28 on the master valve, is divided by a movable diaphragm 29, or like member, into an upper chamber vented to the outer air, and a lower closed chamber 30. The master-valve closure stem 21 is secured by appropriate means to this diaphragm 29, and enters the valve casing through any suitable packing gland or seal. To insure delicacy of action, the drum standard 31 may have an inner tube 32 through which the stem 21 passes freely. An inverted cup 33 on the stem dips into water, oil or other suitable liquid in the annular space around the tube 32, thereby effectually sealing the lower compartment at this point. A spring 34 whose tension may be adjusted by a screw 35 or other suitable counterbalance compensates for the weight of the stem and closure. A plummet 36 may be added to level the drum if desired.

In order to avoid too rapid movement of the bell 11, the latter is preferably provided with a central well 37 extending nearly to its top with an annular air chamber 38 at its base. A tube 39 extending through the chamber, admits water to the bell from the casing 12, as the bell is depressed, through a flexible pipe or hose 40 having an opening as at 41, which may be opened to a greater or less degree by a closure indicated at 42 that may be adjusted from without the casing. This retards the flow either way so that the movements of the bell may be likewise retarded to prevent violent surging.

A pipe 43 conducts purified gas or liquid under head or pressure, from any convenient source of supply to a branch 44 one end of which opens into the lower compartment of the drum 28 and the other extremity of which enters the hydraulic main or conduit 1. If the supply pipes 2 of the latter dip into a liquor seal, as herein indicated, the branch is inserted to the same depth. A restriction 45 is placed in the pipe 43, and is so adjusted as to maintain a column of gas or liquid in the branch at substantially the pressure in the conduit or main. Consequently any rise in pressure in the main above that for which the apparatus is set, is transmitted to the diaphragm of the master valve which in turn directs the flow into the float tank to depress the bell and open the regulating valve sufficiently to increase the outflow until the pressure returns to normal. If the pressure falls, the diaphragm likewise drops, and the master valve turns the flow of operating fluid into the bell, and the regulating valve closes sufficiently to reëstablish the normal pressure. In both cases, the gas or fluid on the low pressure side of the governor is free to escape through the master valve exhaust into the outlet of the main.

In a gas generating or distributing system or apparatus the purified gas is obtained from some part of the system after it has passed the foul gas conduit or like part to be controlled, and, similarly, in water distribution, it may be supplied from some point in the system after it has been filtered or otherwise cleansed. The delicate regulating and operating mechanism is thus kept from being fouled by the contents of the main. However, the pressure of the contents of the conduit to be regulated, may, if conditions permit, be transmitted to the drum of the master valve without the interposition of fluid from a source exterior to the conduit. In such case the pipe 43 is omitted and the branch 44 is not allowed to dip into a liquid seal in the conduit to be regulated.

Obviously, changes in details of construction may be made without departing from the spirit of the invention, and I do not care to limit myself to any particular form or arrangement of parts.

What I claim as my invention is:—

1. The combination of a conduit with means for regulating the flow therethrough, that is controlled by static pressure transmitted from the contents of the conduit by fluid from a source exterior to the conduit.

2. The combination of a conduit with means for regulating the flow therethrough that is controlled by static pressure transmitted from the contents of the conduit through a column of fluid that is extraneous to that in the conduit.

3. The combination of a conduit with means for regulating the flow therethrough that is operated by fluid under pressure from a source exterior to the conduit and is controlled by fluid under static pressure.

4. The combination of a conduit with means for regulating the flow therethrough that is operated by fluid from a source exterior to the conduit and is controlled by static pressure transmitted from the contents of the conduit by fluid from a source exterior to the conduit.

5. The combination of a conduit with means for regulating the flow therethrough that is operated by fluid from a source exterior to the conduit and is controlled by static pressure transmitted from the contents of the conduit by fluid from a source exterior to the conduit, the regulating means being adapted to direct the operating fluid escaping therefrom into the conduit.

6. The combination of a conduit with means governing the flow therethrough, controlled by fluid pressure, and means for transmitting the static pressure of the contents of the conduit to the governing means by fluid from a source exterior to the conduit.

7. The combination of a conduit with means governing the flow therethrough, and means controlling the governing means that acts in response to static pressure transmitted from the contents of the conduit by fluid from a source exterior to the conduit.

8. The combination of a conduit with means governing the flow therethrough operated by fluid from a source exterior to the conduit, and means that acts in response to static pressure transmitted to it from the contents of the conduit by fluid from a source exterior to the conduit, for controlling the admission of fluid to operate the governing means.

9. The combination of a conduit with a valve therein, means operated by fluid from a source exterior to the conduit for governing the valve, and means that acts in response to static pressure transmitted to it from the contents of the conduit by fluid from a source exterior to the conduit, for controlling the admission of fluid to operate the governing means.

10. The combination of a conduit with a valve thereon, a governor for the valve adapted to be operated by fluid under pressure, and means for directing fluid from a source exterior to the conduit to the governor, controlled by static pressure that is transmitted from the contents of the conduit to said means by fluid from a source exterior to the conduit.

11. The combination of a conduit with a valve therein, a governor for the valve, consisting of a casing and a movable member therein operating the valve that is adapted to be moved in either direction by fluid entering the chamber on one side or the other of the member, and means that acts in response to static pressure transmitted to it from the contents of the conduit by fluid from a source exterior to the conduit, for controlling the admission of fluid to operate the governing means.

12. The combination of a conduit with a valve casing therein, a closure in the casing, a closed float tank on the casing provided with an upper and a lower inlet, a float bell therein operatively connected to the closure and disposed mediate the inlets, and means for directing fluid into the inlets from a source exterior to the conduit, that acts in response to static pressure in the contents of the conduit that is transmitted through fluid from a source exterior to the conduit.

13. The combination of a conduit with means governing the flow therethrough adapted to be operated by fluid under pressure, a master valve adapted to admit fluid from a source exterior to the conduit to the governor, and a pressure drum having a movable member operating the master valve, that acts in response to static pressure in the contents of the conduit that is transmitted to the member through fluid from a source exterior to the conduit.

14. The combination of a conduit with means governing the flow therethrough adapted to be operated by fluid under pressure, means for controlling admission of fluid to the governing means and means for maintaining a column of fluid from a source exterior to the conduit between the conduit and means for transmitting static pressure of the contents of the conduit to the governing means.

15. The combination of a conduit with a valve therein, a governor for the valve adapted to be operated by fluid under pressure, a master valve adapted to admit fluid under pressure from a source exterior to the conduit to the governor and to conduct such fluid from the governor to the conduit, means in communication with a source of fluid supply external to the conduit and with the conduit, adapted to operate the master valve in response to static pressure exerted through a fluid from the external source by the contents of the conduit.

16. The combination of a conduit with means governing the flow therethrough adapted to be operated by fluid under pressure, means adapted to direct fluid under pressure to operate the governing means, a pressure drum, a movable member therein operating the directing means and forming with the drum an expansible chamber, and a pipe from a source of fluid supply exterior to the main having a restriction, and opening into a branch which forms a connection between the conduit and expansible chamber.

17. The combination of a conduit with a valve therein, a governor for the valve operated by fluid from a source exterior to the conduit and adapted to tend to close the valve when fluid is admitted through one outlet and to open it when fluid enters a second outlet, a master valve adapted to direct fluid to one outlet of the governor when at one end of its throw, and to the other outlet when at the other end of its throw, and means for throwing the master valve that acts in response to static pressure in the contents of the conduit transmitted by fluid from a source exterior to the conduit.

18. The combination of a conduit with a valve therein, a governor for the valve operated by fluid from a source exterior to the conduit and adapted to tend to close the valve when fluid is admitted through one outlet and to open it when fluid enters a second outlet, a master valve adapted to direct fluid to one outlet of the governor when at one end of its throw, and to the other outlet when at the other end of its throw, and means for throwing the master valve that acts in response to static pressure in the contents of the conduit.

19. The combination of a conduit with a valve therein, a float tank, a float bell therein operatively connected to the valve, means for admitting fluid under pressure to the tank above and below the bell, an air chamber closing the mouth of the bell, means for admitting fluid from the tank into the bell, and manually operable means for regulating the flow through the admitting means.

20. The combination of a conduit with a valve regulating the flow therethrough, a float tank on the casing, a float bell in the tank operatively connected to the valve, a pipe opening into the float tank above the bell, a pipe opening into the tank within the bell, a pipe leading from a source of fluid supply exterior to the conduit, an exhaust pipe discharging into the conduit, and a master valve operated by static pressure of fluid in the conduit and adapted to simultaneously connect either tank pipe with the supply pipe and the other with the exhaust pipe.

21. The combination of a conduit with a valve regulating the flow therethrough, a float tank, a float bell in the tank operatively connected to the valve, adjustable means for controlling the flow between the bell and tank of fluid displaced by movements of the bell, and means operated by static pressure of fluid in the conduit and adapted to admit fluid under pressure to the tank and bell to move the regulating valve in accordance with static pressure in the conduit.

22. The combination of a conduit with a valve regulating the flow therethrough, a governor for the valve operated by fluid pressure, a master valve for admitting fluid under pressure to the governor, a pressure drum on the valve, a movable diaphragm dividing the drum, a stem extending loosely through an opening in the drum into the valve to the closure of which it is connected, a tube in the drum forming an annular space around the stem opening, and an inverted cup on the stem extending into the annular chamber.

In testimony whereof I affix my signature in presence of two witnesses.

FRANK L. CROSS.

Witnesses:
C. R. STICKNEY,
A. M. DORR.